(12) United States Patent
Kondo

(10) Patent No.: US 7,192,099 B2
(45) Date of Patent: Mar. 20, 2007

(54) BRAKE DEVICES

(75) Inventor: Masuhiro Kondo, Obu (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/899,013

(22) Filed: Jul. 27, 2004

(65) Prior Publication Data

US 2005/0023889 A1 Feb. 3, 2005

(30) Foreign Application Priority Data

Jul. 31, 2003 (JP) ............................. 2003-283994

(51) Int. Cl.
*B60T 17/04* (2006.01)

(52) U.S. Cl. .................. 303/87; 303/117.1; 303/116.2; 303/11

(58) Field of Classification Search ............. 303/117.1, 303/119.2, 115.1, 115.4, 116.1, 116.2, 11, 303/DIG. 2, 87, 900; 137/504, 625.65, 625.49
See application file for complete search history.

(56) References Cited

U.S. PATENT DOCUMENTS

| | | | |
|---|---|---|---|
| 3,208,397 A * | 9/1965 | Lehrer et al. .................. 91/6.5 |
| 4,915,459 A * | 4/1990 | Hashida et al. .......... 303/119.2 |
| 5,026,123 A * | 6/1991 | Nokubo et al. .......... 303/117.1 |
| 5,248,191 A * | 9/1993 | Kondo et al. ............ 303/117.1 |
| 5,290,098 A * | 3/1994 | Burgdorf et al. .......... 303/115.4 |
| 5,335,982 A * | 8/1994 | Ando et al. ............... 303/117.1 |
| 5,628,550 A * | 5/1997 | Zaviska et al. .......... 303/115.4 |
| 6,000,764 A | 12/1999 | Dokas |
| 7,090,310 B2 * | 8/2006 | Kondo ........................ 303/87 |

FOREIGN PATENT DOCUMENTS

| JP | 6378856 A * | 4/1988 |
|---|---|---|
| JP | 8230642 | 9/1996 |

* cited by examiner

*Primary Examiner*—Melody M. Burch
(74) *Attorney, Agent, or Firm*—Buchanan Ingersoll & Rooney PC

(57) ABSTRACT

A brake device comprises a brake cylinder, a reservoir, a pump, a master cylinder, and a pulsation-reduction device. The reservoir serves to accumulate a working liquid discharged from the brake cylinder. The pump serves to pump the working liquid accumulated within the reservoir. The master cylinder serves to receive the working liquid discharged from the pump. The pulsation-reduction device comprises a valve device disposed in a communication channel connecting the downstream side of the pump and the master cylinder. The valve device comprises a spool disposed within the communication channel. The spool is movable along the communication channel in response to differences in pressure between the pump side of the communication channel and the master cylinder side of the communication channel. The movement of the spool operates to open and close at least a part of the communication channel.

16 Claims, 2 Drawing Sheets

BRAKE DEVICES

This application claims priority to Japanese patent application Ser. No. 2003-283994, the contents of which are incorporated herein by reference.

BACKGROUND OF THE INVENTION

1. Field of the Invention

The present invention relates to brake devices, and in particular to anti-lock brake devices having a pump operable to pump a working liquid. The pump transfers the working liquid from a reservoir to which the working liquid was previously discharged from a brake cylinder. The pump discharges the working liquid to the hydraulic circuit on the side of a master cylinder.

2. Description of the Related Art

In general, a brake device comprises a master cylinder and a brake cylinder. The master cylinder serves to supply a working liquid to a brake cylinder in response to the operation of a brake pedal. The pressure of the working liquid operates the brake cylinder in order to press a brake pad(s) against a braking surface. Brake devices are known that incorporate an anti-lock device that functions so as to prevent one or more wheels from being accidentally locked (halted in rotation while the vehicle is still moving) during the braking operation. This type of brake device is typically equipped with a reservoir, a pump, and a solenoid valve. The reservoir serves to accumulate the working fluid (liquid) discharged from a brake cylinder during the activation of the anti-lock system. The working liquid is discharged in order to reduce the hydraulic pressure within the brake cylinder for one or more wheels. The pump serves to move the working liquid from the reservoir and discharge the working liquid to the hydraulic circuit on the side of the master cylinder. A reciprocation pump, such as a plunger pump, is typically used as the pump for this purpose. The solenoid valve is operated in order to relieve or apply hydraulic pressure within the brake cylinder. Such brake devices are disclosed in Japanese laid-Open Patent Publication No. 8-230642 and U.S. Pat. No. 6,000,764.

However, the reciprocating pump may produce a pulsation in pressure as the working liquid is discharged from the pump. When such pulsation (pressure variation) is produced, various pipelines as well as the master cylinder of the brake device may vibrate and possibly generate noises. In order to reduce the pulsation or fluctuation of the hydraulic pressure of the working liquid produced by the pump, there has been proposed to provide a buffer chamber in the communication path of the hydraulic circuit between the pump and the master cylinder. However, it has been difficult to sufficiently reduce the pulsation by merely incorporating a buffer chamber.

SUMMARY OF THE INVENTION

It is accordingly an object of the present invention to teach improved brake devices that can effectively reduce the pulsation of the hydraulic pressure of a working liquid that may be generated by the operation of a pump incorporated within the hydraulic circuit.

According to one aspect of the present teachings, brake devices are taught that include a brake cylinder, a reservoir, a pump (such as a reciprocating pump for example), a master cylinder, and a pulsation-reduction device. The reservoir serves to accumulate a working liquid discharged from a brake cylinder. The pump serves to transfer the working liquid accumulated within the reservoir. The master cylinder serves to receive the working liquid discharged from the pump. The pulsation-reduction device serves to reduce the level or the effects of the pulsation of the hydraulic pressure of the working liquid discharged from the pump. The pulsation-reduction device comprises a valve device disposed in a communication channel connecting the downstream side of the pump and the master cylinder. The valve device comprises a spool disposed within the communication channel. The spool is movable along the communication channel in response to the difference in pressure between the pressure in the communication channel on the side of the pump and the pressure in the communication channel on the side of the master cylinder, in order to open and close at least a part of the communication channel allowing the working liquid to move between the two sides of the communication channel.

Therefore, if the pressure on the side of the pump is greater than the pressure on the side of the master cylinder, the spool may open the communication channel so as to permit flow of the working liquid from the pump side to the master cylinder side. The spool may close or narrow the communication channel as soon as the pressure on the side of the master cylinder becomes equal to or greater than the pressure on the side of the pump, so that the pressure on the side of the master cylinder and the pressure on the side of the pump are equalized. As a result, the variation in pressure or the pulsation pressure of the working liquid on the side of the master cylinder is reduced or eliminated.

In another aspect of the present teachings, the pulsation-reduction device further comprises a buffer chamber defined in the communication channel and a cylinder disposed within the buffer chamber. The buffer chamber is separated by the cylinder into a first sub-chamber on the side of the pump and a second sub-chamber on the side of the master cylinder. The first sub-chamber and the second sub-chamber communicate with each other via a communication passage. The spool is slidably disposed within the communication passage. An orifice channel is defined between an outer wall of the spool and an inner wall of the communication passage. The orifice channel is configured to permit and prevent communication between the first and second sub-chambers in response to the movement of the spool relative to the communication passage.

Therefore, the working liquid discharged from the pump first flows into the first sub-chamber. As the spool moves in response to the difference in pressure between the first sub-chamber and the second sub-chamber, the working liquid flows from the first sub-chamber to the second sub-chamber via the orifice channel defined between the spool and the inner wall of the communication passage. Therefore, the spool can be reliably slidably supported within the communication passage. In addition, because the orifice channel is defined between the spool and the inner wall of the communication passage, the communication between the first and second sub-chambers can be easily permitted and prevented in response to the movement of the spool. As a result, the overall construction of the pulsation-reduction device may be simplified.

In another aspect of the present teachings, the spool may have a length greater than the length of the communication passage. The orifice channel is defined by an orifice recess formed in an outer surface of the spool and extending along a length that is greater than the length of the communication passage. Therefore, the first and second sub-chambers communicate with each other via the orifice channel when the spool moves toward the second sub-chamber. The first and second sub-chambers do not communicate with each other when the spool moves toward the first sub-chamber and one end of the orifice channel on the side of the second sub-chamber is sealed by the communication passage.

In order to permit and prevent communication between the first and second sub-chambers, the position of the orifice recess changes as the spool moves relative to the communication passage. In addition, because the orifice recess extends from the side of the first sub-chamber toward the side of the second chamber, the orifice recess may have a relatively simple configuration.

In another aspect of the present teachings, the orifice recess has a cross-sectional area that becomes gradually smaller toward one end of the orifice recess, for example, toward the end on the side of the second sub-chamber. The cross-sectional area is taken perpendicular to the longitudinal length of the orifice recess.

Therefore, as the orifice recess moves together with the spool relative to the second sub-chamber, the one end of the orifice recess having the diminishing cross-sectional area moves into and out of the second sub-chamber. The cross-sectional area of the orifice recess changes along its length (decreasing toward the second sub-chamber), therefore the flow rate of the working liquid flowing through the orifice recess can be gradually increased and decreased as the spool respectively moves toward the second sub-chamber and toward the first sub-chamber. As a result, the flow rate of the working liquid flowing through the orifice recess and the resulting pressure within the second sub-chamber can be finely adjusted so as to reliably reduce the pulsation pressure on the side of the master cylinder.

In another aspect of the present teachings, the orifice recess has a width in the circumferential direction of the spool. The width gradually decreases toward one end of the orifice recess, for example, toward the end on the second sub-chamber side. The orifice recess may have a depth in a radial direction of the spool. Instead of or in addition to the variable width of the orifice recess, the depth of the orifice recess may gradually decreases toward one end of the orifice recess, for example, the end of the orifice recess on the second sub-chamber side.

In another aspect of the present teachings, the brake devices further include a check valve that is disposed between the first sub-chamber and the output side of the pump.

In another aspect of the present teachings, the master cylinder is connected to the brake cylinder via a first conduit. A downstream side of the valve device is connected to the first conduit via a second conduit. The reservoir is connected to the first conduit via a third conduit on a downstream side of a connecting point of the second conduit.

DETAILED DESCRIPTION OF THE INVENTION

Each of the additional features and teachings disclosed above and below may be utilized separately or in conjunction with other features and teachings to provide improved brake devices and methods of using such improved brake devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
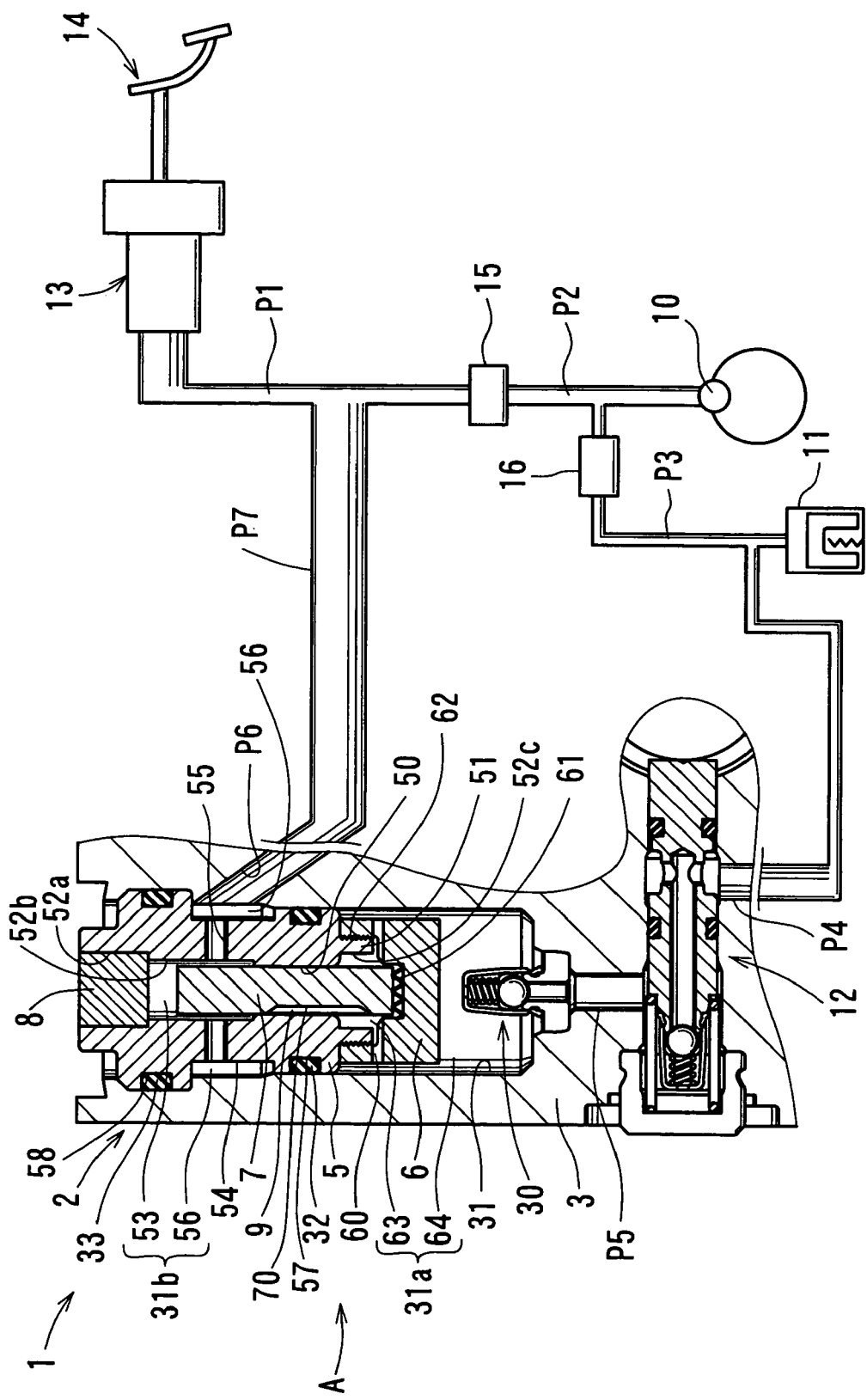
FIG. 1 is a schematic view of a representative brake device in which a pulsation-reduction device and a pump are shown in cross sectional views.

A representative embodiment of the present invention will now be described with reference to FIGS. 1 and 2. Referring to FIG. 1, a representative brake device 1 generally comprises a brake pedal 14, a master cylinder 13, and a brake cylinder 10. In order to provide an anti-lock function, the representative brake device 1 further comprises a reservoir 11, a pump 12, and solenoid valves, 15 and 16. A pulsation-reduction device 2 is disposed in a communication channel connected between the downwstream side of the pump 12 and the master cylinder 13 in order to reduce pulsation or vibratory inducing variance in the hydraulic pressure of a working liquid that is discharged from the pump 12.

The master cylinder 13 is connected to the brake cylinder 10 via a conduit P1, the solenoid valve 15, and a conduit P2. In response to a depressing force applied to the brake pedal 14, the master cylinder 13 pressurizes the working liquid (for example, brake fluid) and consequently applies the pressurized working liquid to the brake cylinder 10. By utilizing the hydraulic pressure of the working liquid, the brake cylinder 10 presses a friction material (not shown) against a brake disk (not shown) in order to inhibit or prevent, for example, the rotation of a wheel such as a vehicle wheel. Although not shown in FIG. 1, the brake device 1 may comprise a plurality of brake cylinders 10. For example, two or more brake cylinders 10 may be arranged in parallel to each other and may be connected to the master cylinder 13.

The brake cylinder 10 is connected to the reservoir 11 via the solenoid valve 16 and a conduit P3. The solenoid valve 15 is positioned between the conduits P1 and P2. The solenoid valve 16 is positioned between the conduit P3 and the brake cylinder 10. The solenoid valves 15 and 16 are operated by control signals from a control unit (not shown) so as to be either opened or closed. When solenoid valve 15 is open and solenoid valve 16 is closed, the hydraulic pressure generated by the operation of the brake pedal is applied to the brake cylinder 10. When the solenoid valve 15 is closed while the solenoid valve 16 is opened, the working liquid may be discharged from the brake cylinder 10, thereby reducing the hydraulic pressure upon the brake cylinder 10. The discharged working liquid from the brake cylinder 10 is accumulated within the reservoir 11. Therefore, the braking force, applied by the brake pads to the wheel associated with the brake cylinder 10, is reduced. As a result, the wheel may be prevented from prematurely stopping rotation or in other words, being locked up due to excessive brake force.

The reservoir 11 is connected to the pump 12 via a conduit P4. The pump 12 is a reciprocating pump, preferably a plunger pump, and serves to transfer the accumulated working liquid from the reservoir 11. In addition, the pump 12 also serves to pressurize the working liquid. The pressurized working liquid is then discharged to the pulsation-reduction device 2. The pump 12 is disposed within a housing 3. As shown in FIG. 1, the pulsation-reduction device 2 may also be disposed within the housing 3. In addition, the reservoir 11 may be disposed within the housing 3 (not shown).

Further, a conduit P5 communicating between the pump 12 and the pulsation-reduction device 2 is shown as disposed within the housing 3. A discharge valve 30 is provided between the conduit P5 and the pulsation-reduction device 2. The discharge valve 30 is configured as a check valve, so that the discharge valve 30 permits the one-way flow of the working liquid from the pump 12 side to the pulsation-reduction device 2 side. However, the discharge valve 30 prevents the working liquid from flowing in a direction from the pulsation-reduction device 2 side to the pump 12 side.

The pulsation-reduction device 2 is located on the downstream side of the pump 12 and serves to reduce the pulsation otherwise occurring in the hydraulic pressure of the working liquid that is discharged from the pump 12. The pulsation-reduction device 2 comprises a buffer chamber 31 that forms a part of a communication path between the downstream side of the pump 12 and the master cylinder 13. The buffer chamber 31 is defined within the housing 3 and has a diameter larger than both the diameter of the conduit P5 as well as the diameter of a conduit P6 that will be explained later. The pulsation-reduction device 2 further comprises a cylinder 5, a spool 7, a stopper 6, and a plug 8, which are all disposed within the buffer chamber 31.

The cylinder 5 has a substantially tubular configuration and is inserted into the buffer chamber 31. Fitting recesses 57 and 58 are formed in the outer circumferential wall of the cylinder 5. O-rings 32 and 33 are respectively provided in the fitting recesses 57 and 58. The O-rings 32 and 33 provide a seal between the outer circumferential wall of the cylinder 5 and the inner circumferential wall of the buffer chamber 31. An annular recess 54 is formed in the outer circumferential wall of the cylinder 5 and is located between the fitting recesses 57 and 58. The annular recess 54 reduces the outer diameter of the cylinder 5. The annular recess 54 defines a liquid chamber 56 between the radially innermost surface of the annular recess 54 and the inner circumferential wall of the buffer chamber 31. The position of the liquid chamber 56 is chosen such that the liquid chamber 56 communicates with the conduit P6 (also formed in the housing 3). The conduit P6 is connected to a conduit P7 that communicates with the master cylinder 13 via conduit P1.

An axial bore extends through the cylinder 5 along the central axis of the cylinder 5. The axial bore comprises a first axial hole 52a, a second axial hole 52b, a communication passage 50 that defines part of the communication channel, and a third axial hole 52c, that are positioned in this sequence from top to bottom as viewed in FIG. 1. The first axial hole 52a has a greater diameter than the diameter of the second axial hole 52b. The first axial hole 52a is also adapted to receive a cylindrical plug 8. Due to the difference in diameters between the first axial hole 52a and the second axial hole 52b, a step is formed so as to engage the plug 8, thereby defining the insertion limit of the plug 8.

The diameter of the second axial hole 52b is greater than both the diameter of the communication passage 50 as well as the diameter of the spool 7 that is inserted into the communication passage 50. Radial liquid channels 55 are formed in the cylinder 5 in order to allow communication between the second axial hole 52b and the annular recess 54. Therefore, a liquid chamber 53 defined within the second axial hole 52b communicates with the liquid chamber 56 via the radial liquid channels 55. The third axial hole 52c also has a larger diameter than the diameter of the communication passage 50. Therefore, the diameter of the third axial hole 52c is larger than the diameter of the spool 7 inserted into the communication passage 50. The lower end of the cylinder 5 is configured as a mount portion 51 having a smaller outer diameter than a portion of the cylinder 5 surrounding the recess 57. The stopper 6 is attached to the mount portion 51.

The stopper 6 is substantially configured as a cylindrical tube having a closed end across the lowermost surface (as seen in FIG. 1). An internal thread 62 may be formed on the inner wall of the upper portion of the stopper 6, engageable with a corresponding external thread formed on an outer wall of the lower part of the mount portion 51. The stopper 6 is preferably mounted to the mount portion 51 through the use of the threaded interface. The upper surface of the closed bottom of the stopper 6 (located inside of the stopper 6) directly opposes the lower end of the spool 7. The closed bottom subsequently limits the downward movement of the spool 7 (first stroke position). As a result, the spool 7 is prevented from being inadvertently removed from the cylinder 5. An elastic member 61 is attached to the bottom surface of the stopper 6 so that any impact applied to the bottom surface of the stopper 6 by the spool 7 can be inhibited, reduced, or absorbed by the elastic member 61. In this way, the elastic member 61 prevents the generation of impact sounds and possible damage of the stopper 6 and the spool 7.

A liquid chamber 64 is defined between the outer wall of the stopper 6 and the inner wall of the buffer chamber 31. A liquid chamber 63 is defined within the inner wall of the stopper 6 by the third axial hole 52c and the bottom surface of the stopper 6. Radial passages 60 are formed to extend through the tubular wall of the stopper 6, so that the liquid chamber 63 communicates with the liquid chamber 64 via the radial passages 60. The liquid chamber 64 communicates with the pump 12 via the discharge valve 30 and the conduit P5. Therefore, the hydraulic pressure within the liquid chamber 63 (that is equal to the hydraulic pressure within the liquid chamber 64) is substantially equal to the hydraulic pressure on the downstream side of the pump 12. The liquid chambers 63 and 64 jointly define a first sub-chamber 31a within the buffer chamber 31.

Conversely, the conduit P7, communicating with the master cylinder 13, also communicates with the liquid chamber 56 via the conduit P6. In addition, the conduit P7 further communicates with the liquid chamber 53 via the radial passages 55. Therefore, the hydraulic pressure within the liquid chambers 53 (that is equal to the hydraulic pressure in liquid chamber 56) is substantially equal to the hydraulic pressure within the conduit P7. The liquid chambers 53 and 56 jointly define a second sub-chamber 31b within the buffer chamber 31. In this way, the cylinder 5 divides the buffer chamber 31 into a first sub-chamber 31a (first buffer chamber) and a second sub-chamber 31b (second buffer chamber).

The first sub-chamber 31a communicates with the second sub-chamber 31b via the communication passage 50 and the spool 7 (slidably received within the communication passage 50). The spool 7 has a substantially cylindrical configuration with an outer diameter that enables the communication passage 50 to slidably engage the spool 7. However, the spool 7 also sealingly contacts the inner wall of the communication passage 50. In addition, the axial length of the spool 7 may be greater than the axial length of the communication passage 50. Thus, the spool 7 is both slidably and sealingly supported within the communication passage 50. An orifice recess 70 may be formed in the outer circumferential wall of the spool 7.

The orifice recess 70 extends part of the way from a position opposing the first sub-chamber 31a in a vertical direction towards the second sub-chamber 31b. The orifice recess 70 and the inner wall of the communication passage 50 opposing the orifice recess 70 define an orifice channel 9. The length of the orifice recess 70 in the vertical direction may be greater than the axial length of the communication passage 50. The orifice recess 70 moves in the vertical direction as the spool 7 initially slides along the communication passage 50. As the spool 7 moves upward toward the second sub-chamber 31b, the first sub-chamber 31a (or the liquid chamber 63) communicates with the second sub-chamber 31b (or the liquid chamber 53) via the orifice recess 70 (although this condition is not shown in FIG. 1). On the other hand, as the spool 7 moves downward toward the first sub-chamber 31b as shown in FIG. 1, the part of the orifice recess 70 opposing second sub-chamber 31b moves into the communication passage 50, causing an interruption of the communication between the first sub-chamber 31a and the second sub-chamber 31b. In addition, as shown in FIG. 2, the width of the orifice recess 70 gradually reduces from the lower end (opposing the first sub-chamber 31a) to the upper end (on the side of the second sub-chamber 31b). In other words, the orifice recess 70 is tapered in the upward direction. Further, preferably the upper end of the orifice recess 70 is configured to taper down to a point. In this way, the cross sectional area of the orifice recess 70 gradually decreases to zero in the upward direction.

Because the plug 8 is inserted into the first axial hole 52a (as shown in FIG. 1), the working liquid within the cylinder 5 is prevented from flowing out of the upper end of the cylinder 5. In addition, the plug 8 limits the upper stroke of the spool 7 and prevents the spool 7 from moving out of the communication passage 50. Furthermore, because the plug 8 limits the upper stroke (second stroke position) of the spool 7, the lower end of the orifice recess 70 may be prevented from entering the communication passage 50.

The operation of the pulsation pressure-reduction device 2 will now be described in connection with the operation of the pump 12. When the pump 12 is operated, the working liquid is discharged into the liquid chamber 64 via the discharge valve 30. The discharged working liquid then pressurizes the liquid chamber 63 via the radial passages 60. Due to the hydraulic pressure within the liquid chamber 63 (i.e., the pressure within the first sub-chamber 31a), a force is applied to the lower portion of the spool 7. If the hydraulic pressure within the liquid chamber 63 is larger than the hydraulic pressure within the liquid chamber 53 located on the upper side of the spool 7, the spool 7 may move upward due to the pressure difference.

As the orifice recess 70 moves upward together with the spool 7, the orifice channel 9 permits communication between the liquid chamber 63 and the liquid chamber 53. The communication allows the working liquid to flow from the higher-pressure liquid chamber 63 to the lower-pressure liquid chamber 53. As a result, there is a decrease in the pressure difference between the two liquid chambers. When the hydraulic pressure within the liquid chamber 53 exceeds the hydraulic pressure within the liquid chamber 63, the spool 7 may move downward, causing the upper end of the of the orifice recess 70 to move into the communication passage 50. As a result, the orifice channel 9 is no longer positioned to allow communication between the liquid chambers 53 and 63.

In this way, communication between the liquid chambers 53 and 63 is alternately permitted and interrupted as the upper end of the orifice recess 70 moves out of and into the communication passage 50 (i.e., the upper end of the orifice recess 70 moves into and out of the liquid chamber 53). If pulsations of pressure appear in the working liquid discharged from the pump 12, the lift of the spool 7 respectively increases and decreases as the pressure increases to the peak value and decreases to the lowest value.

Therefore, the spool 7 and the communication passage 50 comprise a valve mechanism, and the valve mechanism is operated by a pressure difference between the pump 12 side and the master cylinder 13 side of the valve mechanism.

In this representative embodiment, the orifice channel 9 has a smaller cross sectional area than the other liquid channels or paths. Therefore, the orifice channel 9 serves to restrict or inhibit the flow of the working liquid. Consequently, a time lag results in having the pressure within the first sub-chamber 31a become equal to the pressure within the second sub-chamber 31b. In addition, the cross sectional area of the orifice channel 9 may be determined so as to provide an appropriate time lag for suitably suppressing the pulsation effects in the hydraulic pressure of the working liquid supplied from the pump 12.

As described above, according to the representative embodiment, the pulsation-reduction device 2 has a valve mechanism that is operable to open and close in response to the pressure difference between the pump 12 side and the master cylinder 13 side of the valve mechanism. For example, if the hydraulic pressure on the pump 12 side of the valve mechanism is higher than the hydraulic pressure on the master cylinder 13 side of the valve mechanism, the valve mechanism is opened to permit the flow of the working liquid through the communication passage 50. When the hydraulic pressure on the master cylinder 13 side of the valve mechanism becomes equal to or higher than the hydraulic pressure on the pump 12 side of the valve mechanism as a result of the working liquid flowing to the master cylinder 13 side of the valve mechanism, the spool 7 moves to close the communication passage 50 and prevent further flow of the working liquid. Therefore, the pressure on the pump 12 side of the valve mechanism and the pressure on the master cylinder 13 side of the valve mechanism are maintained so as to be substantially equal to each other. As a result, the pulsation or variation in the pressure of the working liquid on the master cylinder 13 side of the valve mechanism can be suppressed or dampened. Consequently, vibrations of the brake device 1 can be reduced so as to inhibit the generation of undesirable sounds that may be produced due to such vibrations.

In addition, the pulsation-reduction device 2 has a spool 7 that moves within the communication passage 50 in response to a difference in pressure between the pump 12 side of the valve mechanism and the master cylinder 13 side in order to open and close at least a part of the communication passage 50. Therefore, the valve mechanism has a relatively simple construction.

Further, the pulsation-reduction device 2 includes the buffer chamber 31 and the cylinder 5 in addition to the spool 7. The cylinder 5 separates the buffer chamber 31 into first and second sub-chambers, 31a and 31b. The spool 7 is slidably inserted into the communication passage 50 defined within the cylinder 5 and moves in response to the pressure difference between the first and second sub-chambers 31a and 31b. The working liquid may flow from the first sub-chamber 31a to the second sub-chamber 31b via the orifice channel 9. The orifice channel 9 is positioned between the spool 7 and the inner wall of the communication passage 50.

The spool 7 can be reliably slidably supported within the communication passage 50. In addition, because the orifice channel 9 is positioned between the spool 7 and the inner wall of the communication passage 50, the orifice channel 9 can be easily opened and closed in response to the movement of the spool 7. In this respect, the pulsation-reduction device 2 also has a simple construction.

Furthermore, because the orifice channel 9 is defined by the orifice recess 70 formed in the spool 7, the orifice recess 70 moves relative to the communication passage 50 as the spool 7 slides along the communication passage 50. The sliding movement of the spool 7 permits and prevents communication between the first sub-chamber 31a and the second sub-chamber 31b by the orifice recess 70. The orifice recess 70 has a relatively simple configuration that extends from the side of the first sub-chamber 31a along a direction towards the second-sub chamber 31b side of the spool 7.

Figure 2:
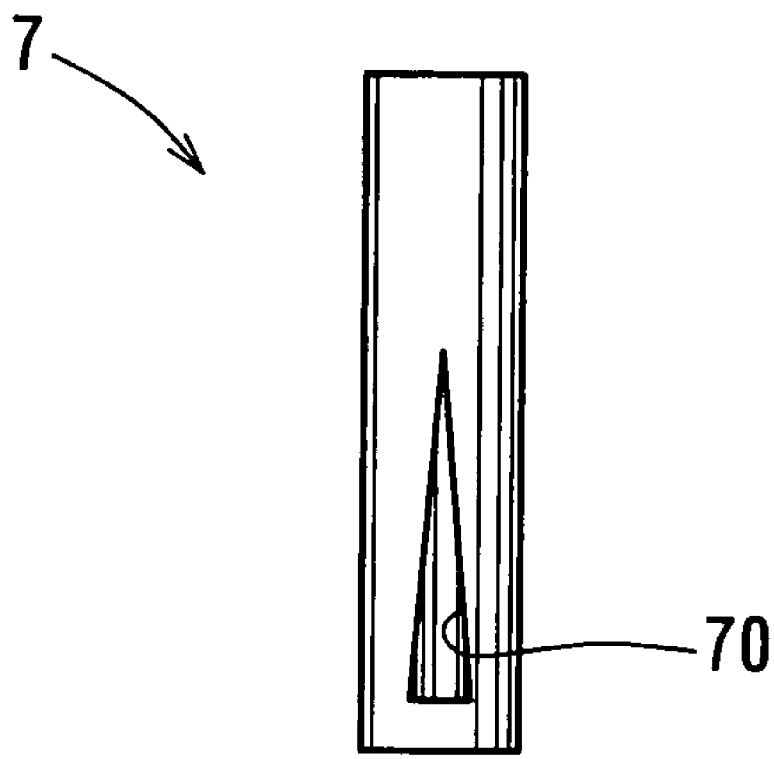
FIG. 2 is a side view of the spool as viewed from the side indicated by an arrow A in FIG. 1.

Furthermore, as shown in FIG. 2, the orifice recess 70 is tapered. The orifice recess 70 is pointed at one end (upper end as viewed in FIG. 2) on the second sub-chamber 31b side of the spool 7. Therefore, as the orifice recess 70 moves with the spool 7 relative to the second sub-chamber 31b, the pointed end of the orifice recess 70 moves into and out of communication with the second sub-chamber 31b. However, because of the variable configuration of the orifice recess 70, the flow rate of the working liquid through the orifice channel 9 gradually increases and decreases as the orifice recess 70 moves together with the spool 7. Therefore, the flow rate can be finely adjusted. Consequently, the hydraulic pressure within the second sub-chamber 31b can also be finely adjusted.

(Other Possible Embodiments)

The present invention may not be limited to the above representative embodiment but may be modified in various ways. For example, although the orifice recess 70 is tapered in the upward direction in the above representative embodiment, the orifice recess 70 may have a depth that changes in the moving direction of the spool 7 such that the depth on the first sub-chamber 31b side is greater than the depth on the second sub-chamber 32b side. In such a case, the orifice recess 70 may have a substantially uniform width throughout its length or may be combined with other features such as a tapered width as in the above representative embodiment. Whereas the taper is described as resulting in a point, various radii of curvatures are considered to be included as opposed to a strict mathematical definition of the term point.

This invention claims:

1. A brake device comprising:
    a brake cylinder,
    a reservoir arranged and constructed to accumulate a working liquid discharged from the brake cylinder,
    a pump arranged and constructed to transfer the working liquid accumulated within the reservoir,
    a master cylinder arranged and constructed to receive the working liquid discharged from the pump, and
    a pulsation-reduction device arranged and constructed to reduce pulsation in pressure of the working liquid discharged from the pump before the discharged working fluid communicates with the master cylinder, wherein the pulsation-reduction device comprises:
        a valve device disposed in a communication channel connecting the downstream side of the pump to the master cylinder, the valve device comprising:
        a spool movable in response to a difference in pressure between a pump side of the communication channel and a master cylinder side of the communication channel,
    wherein the movement of the spool functions to open and close at least a part of the communication channel,
    wherein the pulsation-reduction device further comprises:
        a buffer chamber defined in the communication channel, and
        a cylinder disposed within the buffer chamber,
    wherein the buffer chamber is separated by the cylinder into a first sub-chamber communicating with a discharge side of the pump, and a second sub-chamber communicating with the master cylinder,
    wherein the first sub-chamber and the second sub-chamber communicate with each other via a communication passage that defines a part of the communication channel,
    wherein the spool is slidably disposed within the communication passage;
    wherein an orifice channel is defined between an outer wall of the spool and an inner wall of the communication passage, and
    wherein the orifice channel is configured so as to permit or prevent communication between the first and second sub-chambers in response to movement of the spool relative to the communication passage.

2. The brake device as in claim 1 wherein:
    the orifice channel is defined by an orifice recess formed in the outer wall of the spool; whereby:
    the first sub-chamber communicates with the second sub-chamber via the orifice channel when the spool moves toward the second sub-chamber; and
    the first sub-chamber does not communicate with the second sub-chamber when the spool moves toward the first sub-chamber and causes the orifice channel to be closed by the communication passage.

3. The brake device as in claim 2, wherein the orifice recess extends from a position on the first sub-chamber side of the spool to a position on the second sub-chamber side of the spool, and
    wherein the orifice recess has a cross-sectional area that becomes smaller toward the second sub-chamber side of the spool, so that the flow rate of the liquid flowing through the orifice channel gradually changes in response to the position of the spool.

4. The brake device as in claim 3, wherein the orifice recess has a width in a circumferential direction of the spool, and
    wherein the width gradually decreases toward the second sub-chamber side of the spool.

5. The brake device as in claim 3, wherein the orifice recess has a depth in a radial direction of the spool, and
    wherein the depth gradually decreases toward the second sub-chamber side of spool.

6. The brake device as in claim 1, further comprising a check valve disposed between the first sub-chamber and the output side of the pump.

7. The brake device as in claim 1, wherein the pump comprises a reciprocating pump.

8. The brake device as in claim 1, wherein the master cylinder is connected to the brake cylinder via a first conduit, and wherein a downstream side of the valve device is connected to the first conduit via a second conduit, and wherein the reservoir is connected to the first conduit via a third conduit on a downstream side of the connecting point of the second conduit.

9. A brake device comprising:

a reciprocating pump disposed within a circulation path of a working liquid, the reciprocating pump being operable to pressurize the working liquid, a master cylinder and a brake cylinder disposed within the circulation path and arranged and constructed such that a braking force is applied by the brake cylinder when the master cylinder is operated, a buffer chamber disposed within the circulation path on the downstream side of the reciprocating pump between the reciprocating pump and the master cylinder, a valve device disposed within the buffer chamber, so that the buffer chamber is separated into a first sub-chamber connected to a discharge side of the reciprocating pump and a second sub-chamber connected to the master cylinder, wherein the working fluid discharged from the pump passes through the valve device before communicating with the master cylinder;

wherein the valve device is operable to open and close in response to a pressure difference between the first sub-chamber and the second sub-chamber, so that the valve device is opened to permit communication between the first sub-chamber and the second sub-chamber when the pressure within the first sub-chamber is higher than the pressure within the second sub-chamber, and the valve device is closed to interrupt communication between the first sub-chamber and the second sub-chamber when the pressure within the first sub-chamber is lower than or equal to the pressure within the second sub-chamber, wherein the valve device is a spool valve comprising:
  a spool, and
  a communication passage defined in the buffer chamber between the first sub-chamber and the second sub-chamber,
  wherein the spool moves along the communication passage in order to open and close at least a part of the communication passage in response to the difference in pressure between a pump side of the communication passage and a master cylinder side of the communication passage, and
  an orifice channel defined between the spool and an inner wall of the communication passage,
  wherein the first sub-chamber and the second sub-chamber communication with each other via the orifice channel in response to the position of the spool relative to the communication passage.

10. The brake device as in claim 9, wherein the orifice channel comprises:
  an orifice recess formed on an outer wall of the spool.

11. The brake device as in claim 10, wherein the communication passage has a path length in a longitudinal direction, the orifice recess has a recess length in a longitudinal direction of the spool, and the recess length is greater than the path length.

12. The brake device as in claim 11, wherein:
  a first stroke position is defined when the spool has reached a limit in movement toward the first sub-chamber, and
  a second stroke position is defined when the spool has reached a limit in movement toward the second sub-chamber,
  the orifice recess communicates with only the first sub-chamber when the spool is at the first stroke position,
  the orifice recess communicates with both the first sub-chamber and the second sub-chamber when the spool is at the second stroke position.

13. The brake device as in claim 12, wherein the orifice recess has a cross sectional area perpendicular to the longitudinal length of the orifice recess that becomes smaller in a direction toward the second sub-chamber side from the first sub-chamber side, so that the flow rate of the liquid flowing through the orifice channel gradually changes in response to the position of the spool.

14. The brake device as in claim 12, wherein the orifice recess has a width in a circumferential direction of the spool, and
  wherein the width decreases in the direction toward the second sub-chamber side from the first sub-chamber side.

15. The brake device as in claim 12, wherein the orifice recess has a depth in a radial direction of the spool, and
  wherein the depth decreases in the direction toward the second sub-chamber side from the first sub-chamber side.

16. The brake device as in claim 9 further comprising a check valve disposed between the first sub-chamber and the output side of the reciprocating pump.

* * * * *